(12) United States Patent
Kim et al.

(10) Patent No.: US 12,709,085 B2
(45) Date of Patent: Aug. 18, 2026

(54) WINDOW, ELECTRONIC DEVICE INCLUDING THE SAME, AND METHOD OF MANUFACTURING THE WINDOW

(71) Applicant: Samsung Display Co., LTD., Yongin-si (KR)

(72) Inventors: Kangyoon Kim, Yongin-si (KR); Jusuk Oh, Yongin-si (KR); Bang-Geul Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 255 days.

(21) Appl. No.: 18/206,324

(22) Filed: Jun. 6, 2023

(65) Prior Publication Data

US 2023/0400889 A1 Dec. 14, 2023

(30) Foreign Application Priority Data

Jun. 10, 2022 (KR) ........................ 10-2022-0071013

(51) Int. Cl.
*B32B 17/06* (2006.01)
*B32B 3/10* (2006.01)
*B32B 7/05* (2019.01)

(52) U.S. Cl.
CPC ................ *B32B 17/06* (2013.01); *B32B 3/10* (2013.01); *B32B 7/05* (2019.01)

(58) Field of Classification Search
CPC .............. B32B 17/06; B32B 3/10; B32B 7/05
USPC ........................................................ 428/192
See application file for complete search history.

(56) References Cited

U.S. PATENT DOCUMENTS

| | | | | |
|---|---|---|---|---|
| 5,856,048 | A * | 1/1999 | Tahara | G06K 19/06046 283/88 |
| 6,709,720 | B2 | 3/2004 | Hayakawa et al. | |
| 11,630,484 | B2 * | 4/2023 | Park | G06F 1/1609 361/679.02 |
| 12,197,248 | B2 | 1/2025 | Kim et al. | |
| 2014/0036070 | A1 * | 2/2014 | Eckard | G06T 7/74 348/135 |
| 2017/0147040 | A1 * | 5/2017 | Han | G06F 1/1626 |
| 2017/0236145 | A1 * | 8/2017 | Bobrek | G06Q 30/0201 705/7.29 |
| 2019/0120686 | A1 * | 4/2019 | Oriols Gaja | G01G 15/00 |
| 2023/0400889 | A1 * | 12/2023 | Kim | H04M 1/0266 |

FOREIGN PATENT DOCUMENTS

| | | | |
|---|---|---|---|
| KR | 100537771 | B1 | 12/2005 |
| KR | 20210089285 | A | 7/2021 |
| KR | 20220031783 | A | 3/2022 |

* cited by examiner

*Primary Examiner* — Betelhem Shewareged
(74) *Attorney, Agent, or Firm* — CANTOR COLBURN LLP

(57) ABSTRACT

A window includes a base substrate including a bezel region and a transmission region in a plan view, a light-blocking layer disposed under the base substrate, and overlapping the bezel region, and a printing layer disposed under the light-blocking layer, and including a barcode pattern on a lower surface thereof. The printing layer selectively transmits infrared rays.

10 Claims, 14 Drawing Sheets

WM
NPA
PA
NPA
TA
NSA
ISA
NSA
BS
BL
PL1
PL2
PL
DR3
DR2
DR1
IK1
IK2
IKL

WINDOW, ELECTRONIC DEVICE INCLUDING THE SAME, AND METHOD OF MANUFACTURING THE WINDOW

This application claims priority to Korean Patent Application No. 10-2022-0071013, filed on Jun. 10, 2022, and all the benefits accruing therefrom under 35 U. S. C. § 119, the content of which in its entirety is herein incorporated by reference.

BACKGROUND

1. Field

The disclosure herein relates to a window, an electronic device including the same, and a method of manufacturing the window, and more particularly, to a window including an identification mark, an electronic device including the same, and a method of manufacturing the window.

2. Description of the Related Art

To protect a display panel from an external impact, an electronic device includes a window on the display panel. In addition, an identification mark for checking a source of each component within the electronic device, etc., may be used. Recently, various methods and devices are being proposed to increase the efficiency of a process for forming the identification mark in the window.

SUMMARY

The disclosure provides a window including an identification mark, an electronic device including the same, and a method of manufacturing the window.

An embodiment of the inventive concept provides a window including a base substrate including a bezel region and a transmission region in a plan view, a light-blocking layer disposed under the base substrate, and overlapping the bezel region, and a printing layer disposed under the light-blocking layer, and including a barcode pattern. The printing layer selectively transmits infrared rays.

In an embodiment, the bezel region may include an infrared detection region and a non-detection region, and the printing layer may overlap the non-detection region. In an embodiment, the bezel region may surround the transmission region in the plan view, and the light-blocking layer may extend along the bezel region and may entirely overlap the bezel region.

In an embodiment, the light-blocking layer may include a first light-blocking part under which the printing layer is disposed, and a second light-blocking part which does not overlap the printing layer in the plan view.

In an embodiment, the barcode pattern may be defined in a lower surface of the printing layer.

In an embodiment, the printing layer may include a base resin and a pigment or dye dispersed in the base resin.

In an embodiment, the printing layer may include a first printing layer disposed under the light-blocking layer, and a second printing layer disposed under the first printing layer. In an embodiment, the barcode pattern may be defined in a lower surface of the second printing layer.

In an embodiment, the barcode pattern may be a two-dimensional pattern having a matrix form, and may be engraved in a lower surface of the printing layer.

In an embodiment of the inventive concept, an electronic device includes a window including a transmission region and a bezel region divided into an infrared detection region and a non-detection region, and a display panel disposed under the window. The window includes a base substrate, a light-blocking layer disposed under the base substrate, and overlapping the non-detection region, a printing layer disposed under the light-blocking layer, and including a barcode pattern, and an ink layer disposed under the base substrate, overlapping at least a part of the infrared detection region, and spaced apart from the printing layer in a plan view, and a material included in the printing layer may be identical to a material included in the ink layer.

In an embodiment, the electronic device may further include an infrared detection sensor overlapping the infrared detection region, and disposed under the display panel.

In an embodiment, the ink layer may selectively transmit infrared rays, and the printing layer may selectively transmit infrared rays.

In an embodiment, the ink layer may include a first part overlapping the infrared detection region, and a second part extending from the first part and disposed under the light-blocking layer.

In an embodiment, the printing layer may include a first printing layer disposed under the light-blocking layer and a second printing layer disposed under the first printing layer, and the ink layer may include a first ink layer disposed under the base substrate and a second ink layer disposed under the first ink layer.

In an embodiment, a material included in the first printing layer may be identical to a material included in the first ink layer, and a material included in the second printing layer may be identical to a material included in the second ink layer. In an embodiment, the second printing layer and the second ink layer may each include a white ink.

In an embodiment of the inventive concept, a method of manufacturing a window includes providing a base substrate including a transmission region and a bezel region in a plan view, forming a light-blocking layer overlapping the bezel region under the base substrate, forming a printing layer under the light-blocking layer, and engraving a barcode pattern in a lower surface of the printing layer by etching a part of the lower surface of the printing layer. The printing layer selectively transmits infrared rays.

In an embodiment, the engraving of a barcode pattern in a lower surface of the printing layer may include emitting laser onto the part of the lower surface of the printing layer.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
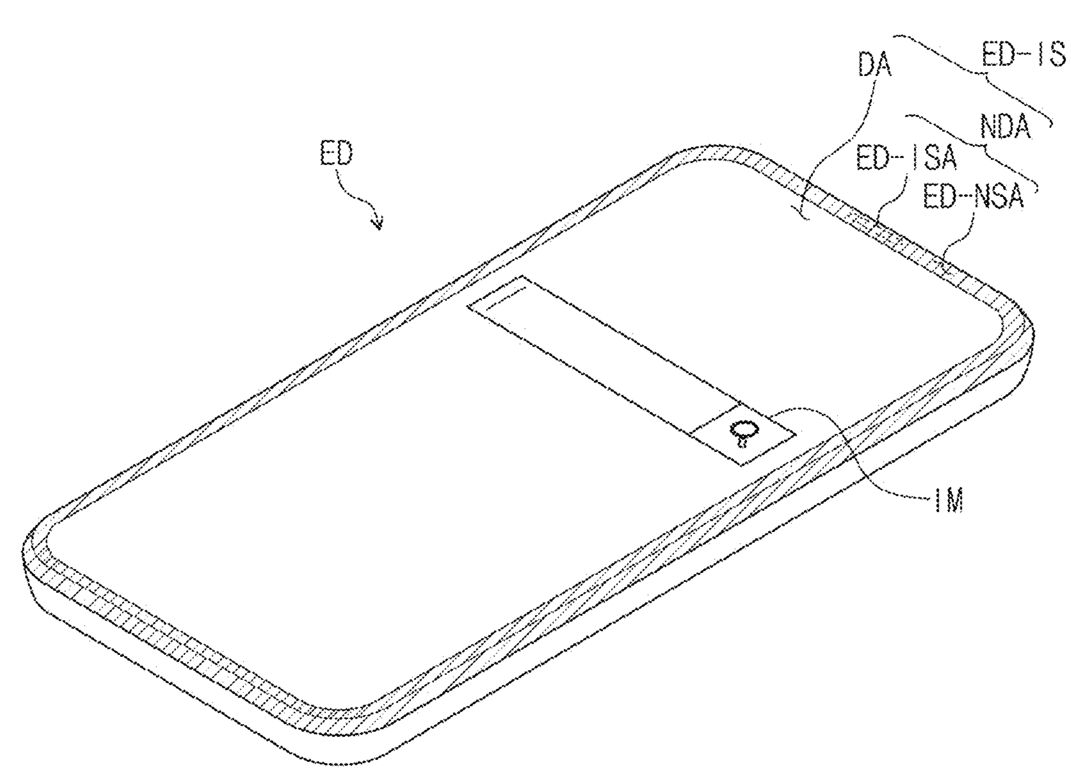
FIG. 1 is a perspective view of an embodiment of an electronic device according to the inventive concept.
Figure 1:
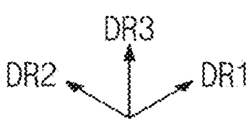

In this specification, when a component (or region, layer, portion, etc.) is referred to as "on", "connected", or "coupled" to another component, it means that it is placed/connected/coupled directly on the other component or a third component can be disposed between them.

The same reference numerals or symbols refer to the same elements. In addition, in the drawings, thicknesses, ratios, and dimensions of components are exaggerated for effective description of technical content. "And/or" includes all combinations of one or more that the associated elements may define.

Terms such as first and second may be used to describe various components, but the components should not be limited by the terms. These terms are only used for the purpose of distinguishing one component from other components. For example, without departing from the scope of the present invention, a first component may be referred to as a second component, and similarly, a second component may be referred to as a first component. Singular expressions include plural expressions unless the context clearly indicates otherwise.

In addition, terms such as "below", "lower", "above", and "upper" are used to describe the relationship between components shown in the drawings. The terms are relative concepts and are described based on the directions indicated in the drawings.

Terms such as "include" or "have" are intended to designate the presence of a feature, number, step, action, component, part, or combination thereof described in the specification, and it should be understood that it does not preclude the possibility of presence or addition of one or more other features, numbers, steps, operations, components, parts, or combinations thereof.

In the application, "directly disposed" may mean that there is no layer, film, region, plate, etc. added between a portion such as a layer, film, region, or plate and another portion. For example, "direct disposed" may mean placing two layers or two members without using an additional member such as an adhesive member therebetween.

The term such as "module" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used in this specification have the same meaning as commonly understood by one of ordinary skill in the art to which this invention belongs. In addition, terms such as terms defined in commonly used dictionaries should be interpreted as having a meaning consistent with the meaning having in the context of the related technology, and should not be interpreted as too ideal or too formal unless explicitly defined here.

Hereinafter, embodiments of the inventive concept will be described with reference to the drawings.

Figure 2:
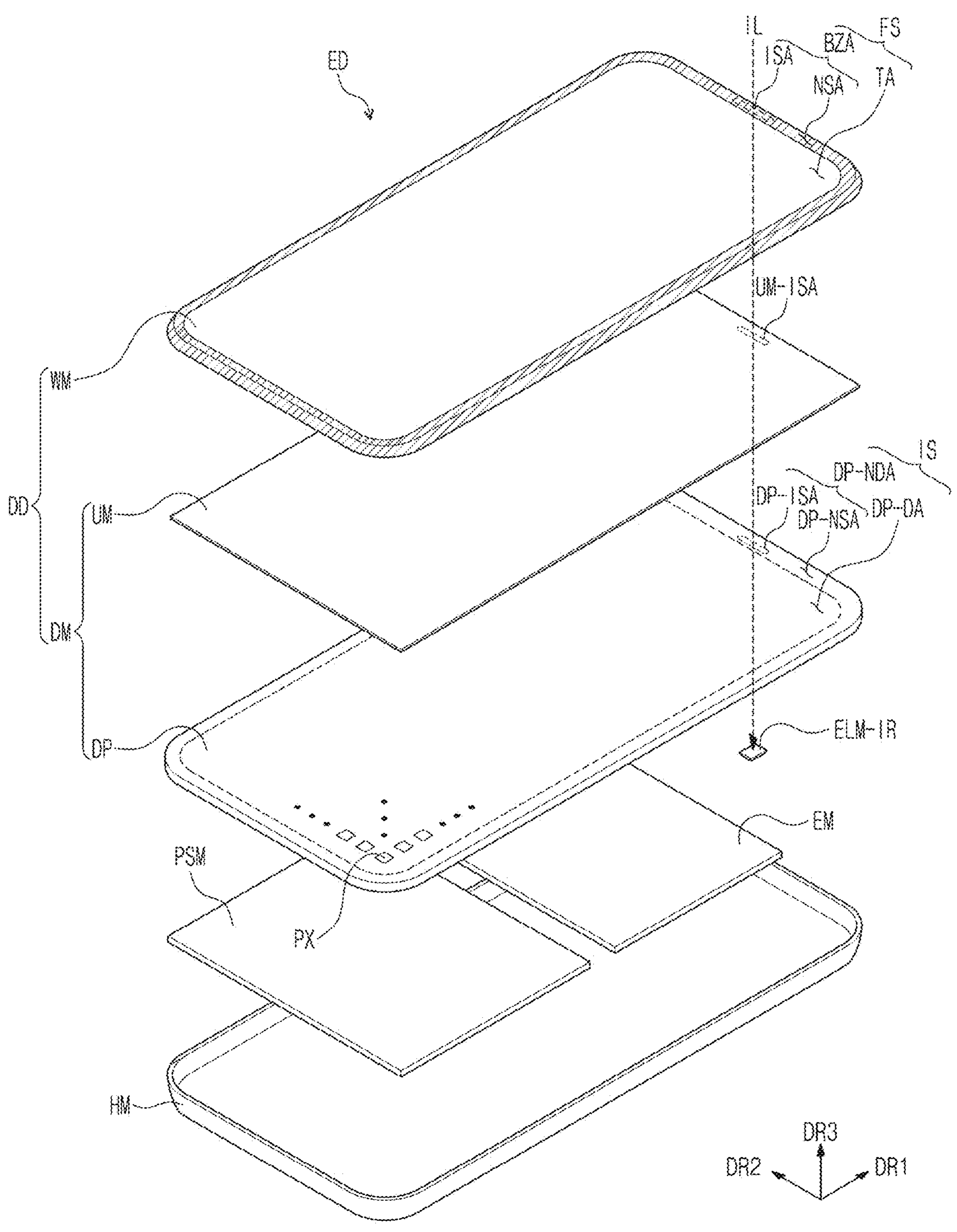
FIG. 2 is an exploded perspective view of an embodiment of an electronic device according to the inventive concept.
Figure 3:
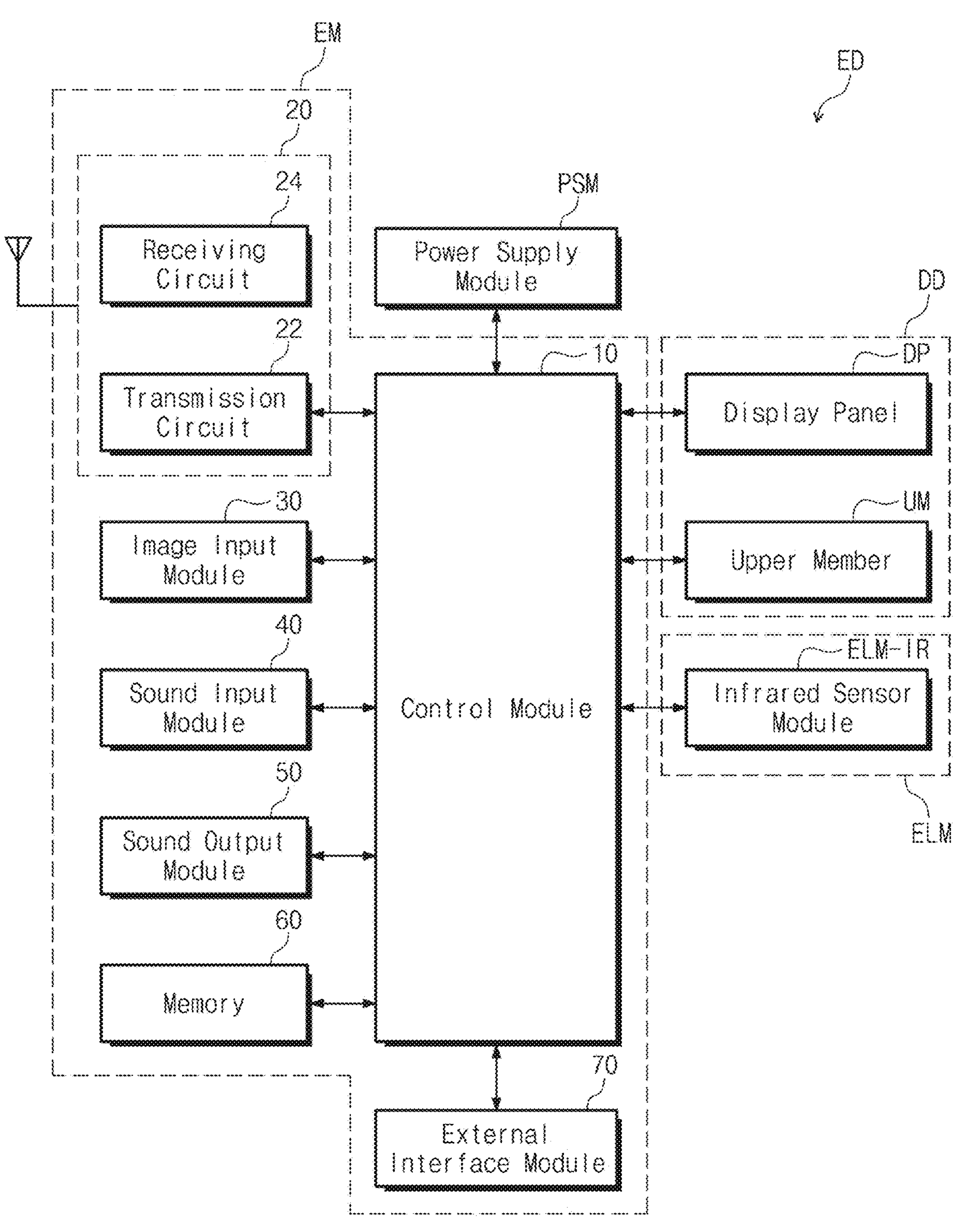
FIG. 3 is a block diagram of an embodiment of an electronic device according to the inventive concept.

FIG. 1 is a perspective view of an embodiment of an electronic device ED according to the inventive concept. FIG. 2 is an exploded perspective view of an embodiment of the electronic device ED according to the inventive concept. FIG. 3 is a block diagram of an embodiment of the electronic device ED according to the inventive concept.

As illustrated in FIG. 1, the electronic device ED may display an image IM through a display surface ED-IS. The display surface ED-IS is parallel to a plane defined by a first direction DR1 and a second direction DR2. The normal direction of the display surface ED-IS, that is, the thickness direction of the electronic device ED is indicated by a third direction DR3. The display surface ED-IS of the electronic device ED corresponds to the front surface of the electronic device ED, and may correspond to the upper surface of a window WM.

The front surface (or upper surface) and the rear surface (or lower surface) of each member or unit to be described hereinafter are defined based on the third direction DR3. However, the first to third directions DR1, DR2, and DR3 illustrated in the illustrated embodiment are only illustrative. The display surface ED-IS may include a display region DA and a non-display region NDA adjacent to the display region DA. The non-display region NDA is a region on which an image is not displayed. In an embodiment, the non-display region NDA may include a detection region ED-ISA of the electronic device ED and a non-detection region ED-NSA of the electronic device ED.

In the illustrated embodiment, the detection region ED-ISA of the electronic device ED may be a region in which a light signal is transmitted or an external light signal is received. Here, the light signal may be infrared rays.

In addition, in FIG. 1, the detection region ED-ISA of the electronic device ED is defined on the upper end of the non-display region NDA, but may be defined in various regions such as the upper right end, the lower left end, or the lower right end thereof.

As a region blocking the light signal, the non-display region NDA may be disposed outside the display region DA to surround the display region DA. In an embodiment, the non-display region NDA may be disposed on at least a part of a side surface of the electronic device ED, not on the front surface thereof.

In the illustrated embodiment, a flat display surface ED-IS is illustrated, but in an embodiment, curved regions may be disposed on opposite sides of the display surface ED-IS facing each other in the second direction DR2.

In the illustrated embodiment, a mobile phone is illustrated, but an electronic device according to the inventive concept is not limited thereto. The electronic device may be changed to various information providing devices such as a tablet computer, a car navigation, a game console, or a wearable device.

As illustrated in FIGS. 1 to 3, the electronic device ED may include a display device DD, an electronic module EM, an electronic optical module ELM, a power supply module PSM, and a housing HM.

The display device DD may generate an image. The display device DD may include a display module DM and a window WM.

The window WM is disposed on the display module DM to cover a front surface IS of a display panel DP. The window WM includes a front surface FS exposed to the outside. An image displayed on the display module DM is viewed from the outside through the front surface FS. The front surface FS of the window WM may be divided into a transmission region TA and a bezel region BZA in a plan view.

The transmission region TA may be a region that transmits incident light. The transmission region TA may have a shape corresponding to the display region DA of the electronic device ED. In an embodiment, the transmission region TA overlaps the entirety of the surface or at least a part of the display region DA of the electronic device ED, for example. The image IM displayed in the display region DA of the electronic device ED may be viewed from the outside through the transmission region TA.

The bezel region BZA may be a region having a relatively lower light transmittance than that of the transmission region TA. The bezel region BZA defines the shape of the transmission region TA. The bezel region BZA may be adjacent to the transmission region TA, and surround the transmission region TA. The bezel region BZA may include an infrared detection region ISA detecting infrared rays and a non-detection region NSA.

The bezel region BZA may cover the non-display region NDA of the electronic device ED to block the non-display region NDA from being viewed from the outside.

The display module DM may include the display panel DP and an upper member UM. In an embodiment, the upper member UM may include an infrared detection region UM-ISA corresponding to the infrared detection region ISA of the bezel region BZA. Although not illustrated, the upper member UM may include an input detection sensor or an anti-reflective layer, and may be bonded thereto through an adhesive layer. The input detection sensor may acquire coordinate information about a user's input. The anti-reflective layer may prevent elements constituting a display panel from being viewed from the outside by external light incident through the front surface of the display device.

A display region DP-DA and a non-display region DP-NDA respectively corresponding to the display region DA and the non-display region NDA of the electronic device ED may be defined in the display panel DP. A detection region DP-ISA and a non-detection region DP-NSA respectively corresponding to the detection region ED-ISA and the non-detection region ED-NSA of the electronic device ED may be defined in the non-display region DP-NDA.

The display panel DP is not particularly limited, and for example, may be a light-emitting display panel such as an organic light-emitting display panel or a quantum dot light-emitting display panel. The display panel DP may include a plurality of pixels PX disposed in the display region DP-DA. The pixels PX display light in response to an electrical signal. The image IM is achieved by light displayed by the pixel PX.

The electronic module EM may include a control module 10, a wireless communication module 20, an image input module 30, a sound input module 40, a sound output module 50, a memory 60, an external interface module 70, etc. The modules may be disposed (e.g., mounted) on the circuit board, or be electrically connected through a flexible circuit board. The electronic module EM is electrically connected to the power supply module PSM.

The control module 10 controls the overall operations of the electronic device ED. In an embodiment, the control module 10 activates or deactivates the display device DD according to a user's input, for example. The control module 10 may control the image input module 30, the sound input module 40, the sound output module 50, etc., according to a user's input. The control module 10 may include at least one microprocessor.

The wireless communication module 20 may transmit/receive wireless signals with other terminals using Bluetooth® or a Wi-Fi line. The wireless communication module 20 may transmit/receive a sound signal using a general communication line. The wireless communication module 20 includes a transmission circuit 22 which modulates and transmits a signal to be transmitted, and a receiving circuit 24 which demodulates a received signal.

The image input module 30 processes an image signal and converts into image data displayable on the display device DD. The sound input module 40 receives an external sound signal by a microphone in a record mode, a voice recognition mode, or the like, and converts the received sound signal into electrical voice data. The sound output module 50 converts sound data received from the wireless communication module 20 or sound data stored in the memory 60 and outputs the converted result to the outside.

The external interface module 70 serves as an interface connected to an external charger, a wired/wireless data port, a card socket (e.g., a memory card, a subscriber identity module/user identity module ("SIM/UIM") card), or the like.

The power supply module PSM supplies a power desired for the overall operations of the electronic device ED. The power supply module PSM may include a normal battery device.

The housing HM illustrated in FIG. 2 is coupled to the display device DD, in particular the window WM to accommodate the other modules. The housing HM composed of one member is illustrated in FIG. 2. However, the housing HM may include two or more parts assembled together.

The electronic optical module ELM may be an electronic part that outputs or receives a light signal. The electronic optical module ELM may be disposed under the display device DD, specifically under the display module DM. The display device DD in an embodiment may include at least one electronic optical module ELM.

Although not illustrated, the electronic optical module ELM may include a camera module. The electronic optical module ELM may receive natural light to capture an external image.

In the illustrated embodiment, the electronic optical module ELM may include an infrared detection sensor ELM-IR. The infrared detection sensor ELM-IR may be disposed corresponding to the infrared detection region ISA. The infrared detection sensor ELM-IR may detect infrared rays IL through the infrared detection region ISA, and may easily transmit and/or receive signals. The infrared detection sensor ELM-IR is disposed under the display device DD in FIG. 2, but may be disposed in various regions such as in the display module DM or in the display panel DP as desired.

Although not illustrated, the infrared detection sensor ELM-IR may include an emitting part that emits infrared rays and a receiving part. The receiving part may be a component that when infrared rays emitted from the emitting part are reflected at an external object, receives the infrared rays and generates an electrical signal. In an embodiment, the infrared detection sensor ELM-IR may be a biometric sensor, for example.

Hereinafter, the window WM will be described in more detail.

Figure 4:
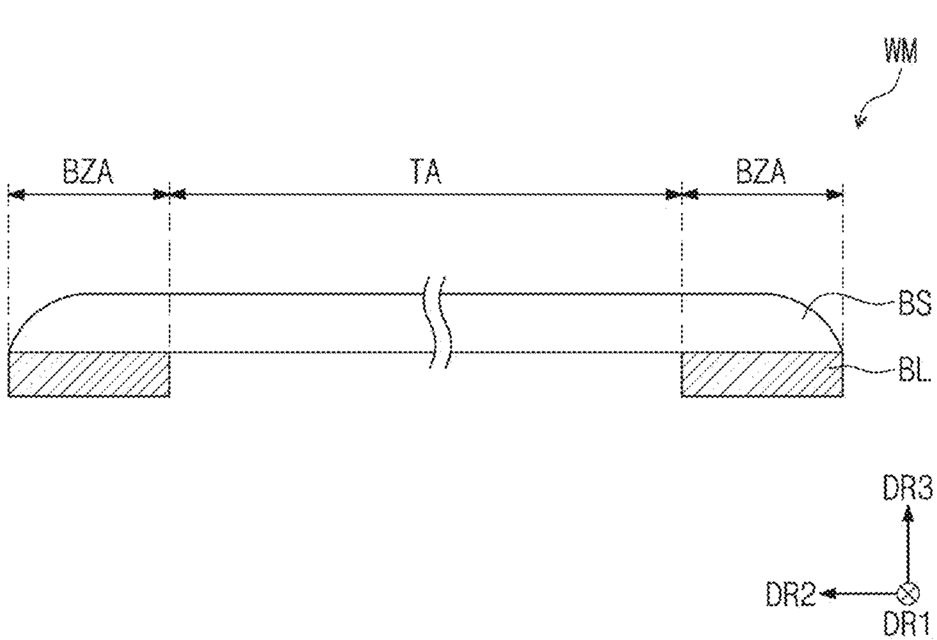
FIG. 4 is a cross-sectional view of an embodiment of a window according to the inventive concept.
Figure 5:
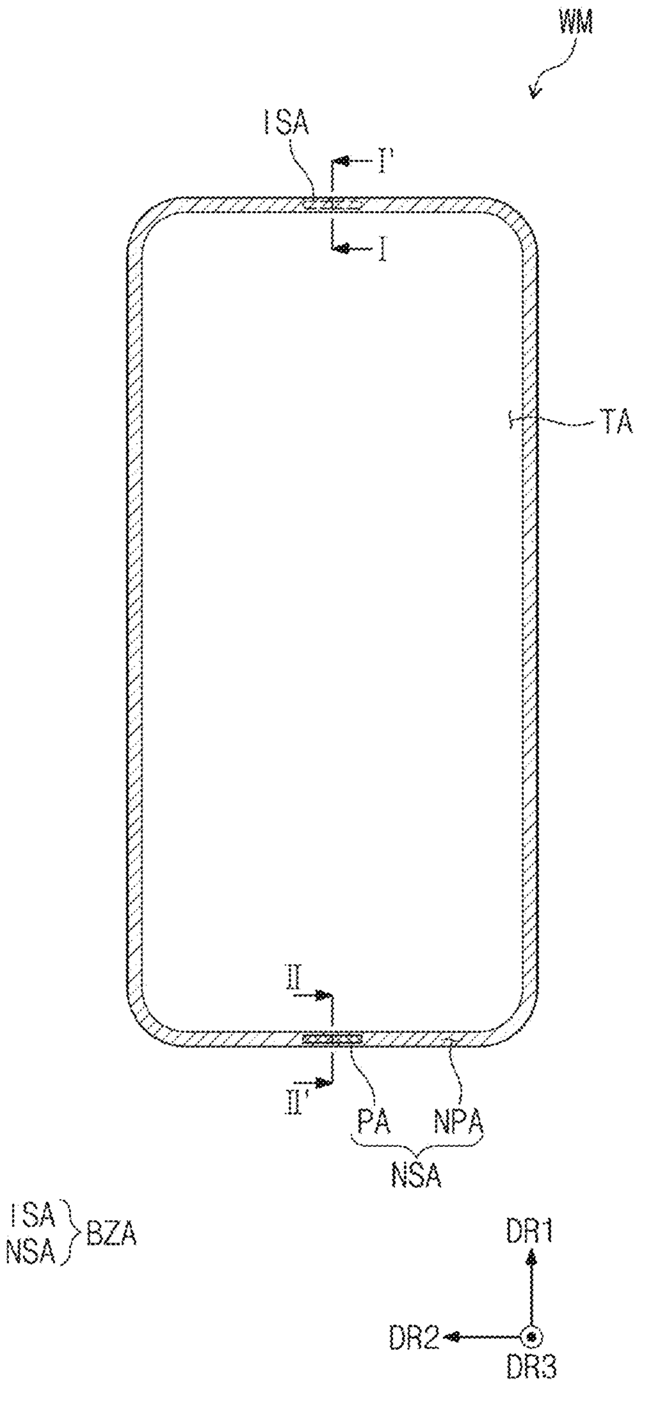
FIG. 5 is a plan view of an embodiment of a window according to the inventive concept.

FIG. 4 is a cross-sectional view of an embodiment of a window according to the inventive concept. FIG. 5 is a plan view of an embodiment of the window according to the inventive concept. Hereinafter, a detailed description of the same configuration as that described with reference to FIGS. 1 to 3 will be omitted.

As illustrated in FIG. 4, a window WM may include a base substrate BS and a light-blocking layer BL. As described later, the window WM may further include a printing layer PL (refer to FIG. 7A) as desired. The window WM in an embodiment of the inventive concept may include various embodiments, and is not limited to any particular embodiment.

The base substrate BS may be optically transparent. In an embodiment, the base substrate BS may have flexible characteristics. In an embodiment, the base substrate BS may include a synthetic resin such as polyimide, for example.

In an alternative embodiment, the base substrate BS may include ultra-thin glass ("UTG"). Specifically, the base substrate BS may include glass, and may have a thickness of about 20 micrometers (μm) to about 80 μm. When the base substrate BS has a thickness of less than about 20 μm, the window WM may be difficult to have sufficient rigidity and may be easily damaged by an external impact. In an embodiment, in a flexible display device DD, during folding and unfolding operations of the display device DD, the window WM may be damaged, for example. When the base substrate BS has a thickness of more than about 80 μm, the flexible characteristics of the window WM are deteriorated, and thus the folding and unfolding operations of the display device DD may not be easily performed.

The light-blocking layer BL may be disposed on the lower surface the base substrate BS. The lower surface of the base substrate BS may be a surface adjacent to the display module DM (refer to FIG. 2) described above. The light-blocking layer BL may overlap the bezel region BZA of the base substrate BS. The light-blocking layer BL may substantially define the bezel region BZA of the window WM. In an embodiment of the inventive concept, the light-blocking layer BL may cover a non-detection region NSA illustrated in FIG. 5 of the bezel region BZA. The light-blocking layer BL may extend along the bezel region BZA. However, the light-blocking layer BL may be disposed not to overlap an infrared detection region ISA illustrated in FIG. 5 of the bezel region BZA.

The light-blocking layer BL may include at least one of a colored color layer or a black light-blocking layer. The light-blocking layer BL may include a plurality of light-blocking layers as desired. The light-blocking layer BL may be formed on the base substrate BS through deposition, printing, coating or the like. In an embodiment, the light-blocking layer BL may be formed by printing, onto the base substrate BS, an ink including a light-blocking ingredient, for example.

As illustrated in FIG. 5, the window WM may be divided into the transmission region TA and the bezel region BZA in a plan view.

The bezel region BZA may include the infrared detection region ISA that detects infrared rays and the non-detection region NSA. FIG. 5 illustrates that the infrared detection region ISA is defined at the center of the upper end of the window WM, but the inventive concept is not necessarily limited thereto. The infrared detection region ISA may be freely defined in the bezel region BZA as desired.

The non-detection region NSA may be divided into a pattern region PA and a non-pattern region NPA. FIG. 5 illustrates that the pattern region PA is defined at the center of the lower end of the window WM, but the inventive concept is not necessarily limited thereto. The pattern region PA may be freely defined, e.g., at the left side of the lower end, at the right side of the upper end of the window WM in the non-detection region NSA as desired.

Figure 6A:
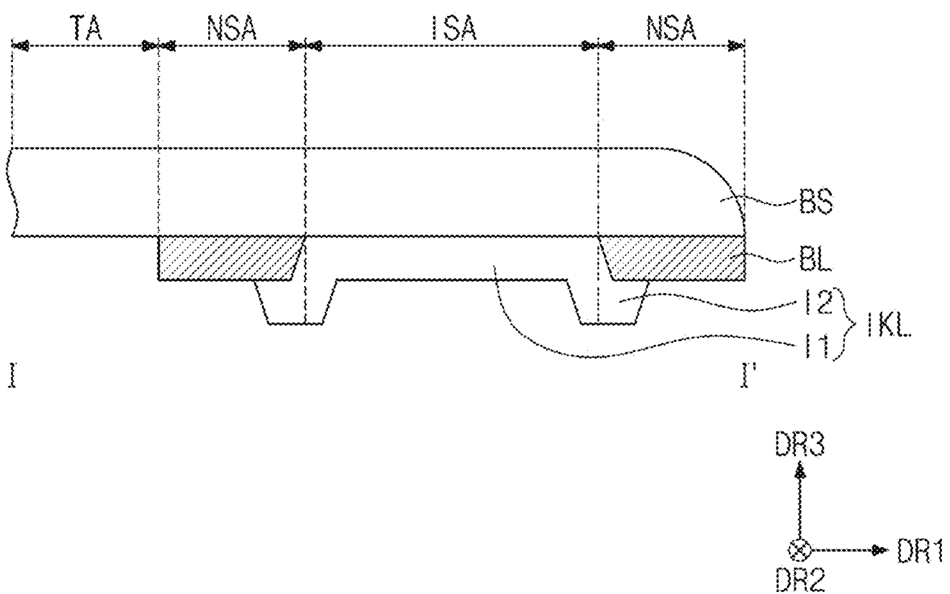
FIGS. 6A and 6B are each a cross-sectional view of an embodiment of a window according to the inventive concept.
Figure 6B:
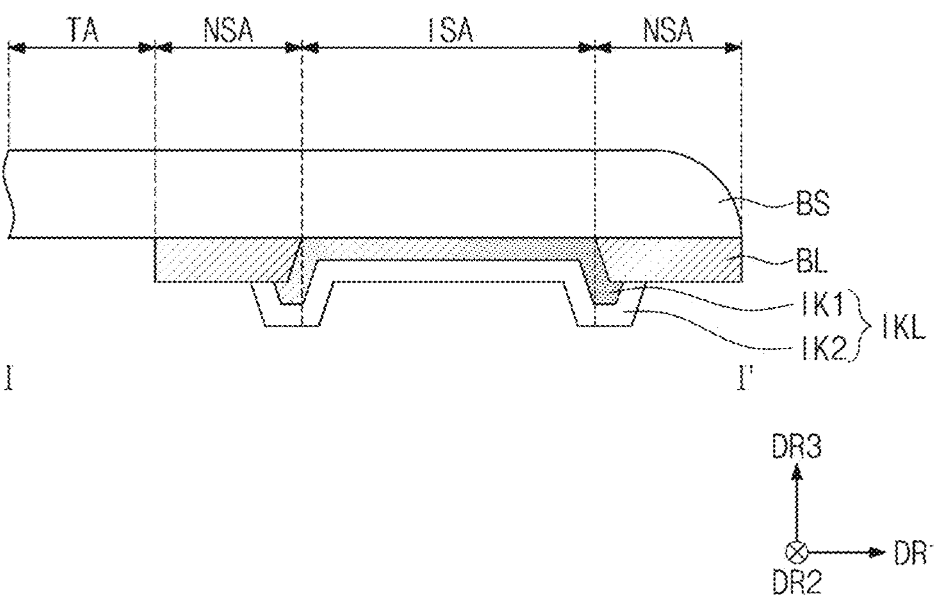

FIGS. 6A and 6B are each a cross-sectional view of an embodiment of a window according to the inventive concept. FIGS. 6A and 6B are each a cross-sectional view taken along line I-I' of FIG. 5.

As illustrated in FIGS. 6A and 6B, a window WM may include an ink layer IKL disposed under a base substrate BS.

The ink layer IKL may be disposed on a lower surface of the base substrate BS to overlap at least a part of an infrared detection region ISA. The ink layer IKL may substantially define the infrared detection region ISA. The ink layer IKL may cover the infrared detection region ISA of a bezel region BZA. That is, in place of a light-blocking layer BL, the ink layer IKL may be disposed on the lower surface of the base substrate BS in the infrared detection region ISA.

As illustrated in FIG. 6A, the ink layer IKL may include a first part I1 overlapping the infrared detection region ISA and a second part 12 overlapping the non-detection region NSA. The first part I1 may be directly disposed on the lower surface of the base substrate BS of the infrared detection region ISA. The second part 12 may extend from the first part I1, and may be directly disposed on a lower surface of the light-blocking layer BL overlapping the non-detection region NSA. The first part I1 and the second part 12 may be formed by the same process during manufacturing.

In a plan view, the ink layer IKL may be spaced apart from a printing layer PL (refer to FIG. 7A) and a barcode pattern BCP (refer to FIG. 7A) to be described later. In an embodiment, while the ink layer IKL is disposed in the infrared detection region ISA defined on a part of the lower surface of the base substrate BS in the upper-end center of the window WM, the printing layer PL (refer to FIG. 7A) and the barcode pattern BCP (refer to FIG. 7A) to be described later may be disposed in a pattern region PA (refer to FIG. 7A) defined on a part of the lower surface of the base substrate BS in the lower-end center of the window WM.

The ink layer IKL may be formed on the base substrate BS through deposition, printing, coating, or the like. The ink layer IKL may include a base resin, and a pigment or dye dispersed in the base resin.

The ink layer IKL may include an infrared ink. The ink layer IKL may absorb visible rays, and may transmit infrared rays. At least one among the base resin and the pigment or dye included in the ink layer IKL may selectively transmit infrared rays among visible rays and infrared rays. In an embodiment, the ink layer IKL may absorb about 90% or more of visible rays, and may transmit about 80% or more, or about 90% or more of infrared rays, for example. Accordingly, infrared rays emitted from an infrared detection sensor ELM-IR (refer to FIG. 2) disposed to overlap the infrared detection region ISA in an electronic device ED (refer to FIG. 2) may be emitted to the outside through the ink layer IKL, and infrared rays reflected by an external material may transmit the ink layer IKL to reach the infrared detection sensor ELM-IR (refer to FIG. 2).

As illustrated in FIG. 6B, the ink layer IKL may include a first ink layer IK1 disposed under the base substrate BS and a second ink layer IK2 disposed under the first ink layer IK1. The second ink layer IK2 may be disposed directly on a lower surface of the first ink layer IK1. The second ink layer IK2 may overlap a part of the light-blocking layer BL, while covering a side surface of the first ink layer IK1 in the non-detection region NSA. The first ink layer IK1 may include a black ink or a colored ink, and the second ink layer IK2 may include a white ink.

Figure 7A:
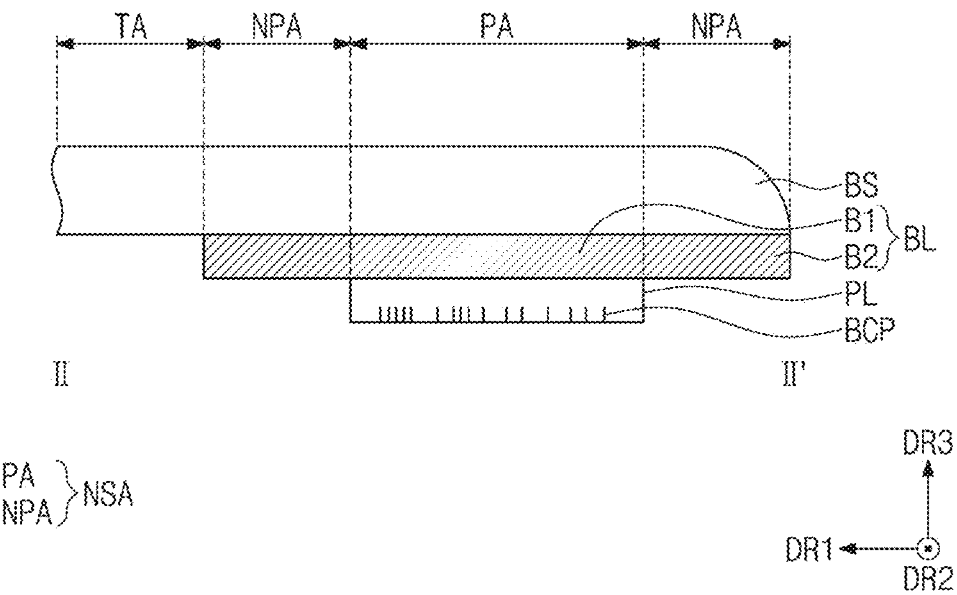
FIGS. 7A and 7B are each a cross-sectional view of an embodiment of a window according to the inventive concept.
Figure 7B:
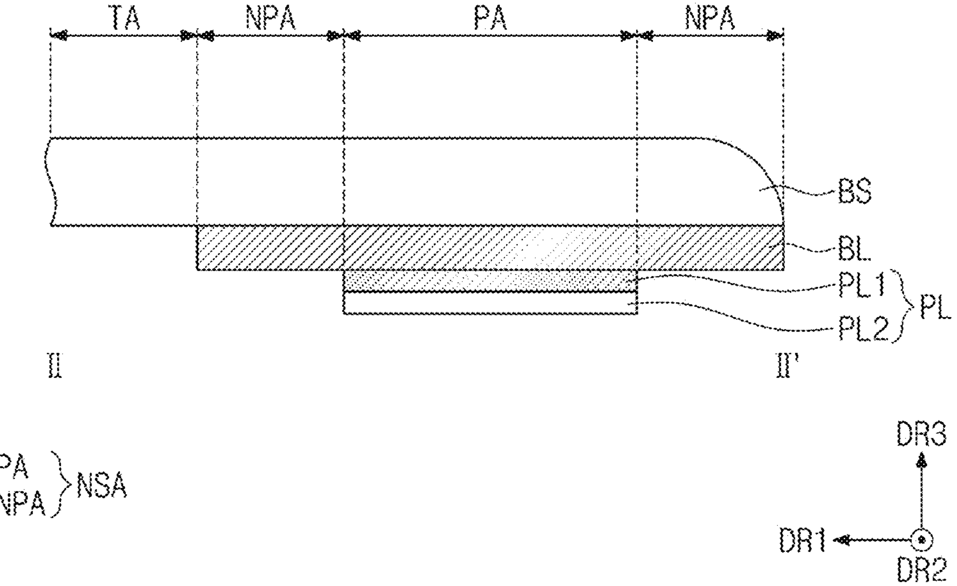

FIGS. 7A and 7B are each a cross-sectional view of an embodiment of a window according to the inventive concept. FIGS. 7A and 7B are each a cross-sectional view taken along line II-II' of FIG. 5.

As illustrated in FIGS. 7A and 7B, a window WM may include a light-blocking layer BL, a printing layer PL disposed on a lower surface of the light-blocking layer BL, and a barcode pattern BCP included in the printing layer PL. The barcode pattern BCP may be engraved in a lower surface of the printing layer PL.

The light-blocking layer BL may be disposed on a lower surface of the base substrate BS, while overlapping a non-detection region NSA of a bezel region BZA. The light-blocking layer BL may extend along the non-detection region NSA and may be disposed to entirely overlap the non-detection region NSA. The light-blocking layer BL may not overlap the infrared detection region ISA (refer to FIG. 5) of the window WM described above.

As illustrated in FIG. 7A, the light-blocking layer BL may be divided into a first light-blocking part B1 under which the printing layer PL is disposed, and a second light-blocking part B2 under which the printing layer PL is not disposed. The first light-blocking part B1 may be disposed to overlap a pattern region PA, and the second light-blocking part B2 may be disposed to overlap anon-pattern region NPA. That is, the first light-blocking part B1 and the printing layer PL may be sequentially disposed on the lower surface of the base substrate BS in the pattern region PA. The width of the first light-blocking part B1 and the width of the printing layer PL may be substantially the same.

In an embodiment, the light-blocking layer BL may have a greater thickness than that of the printing layer PL. The light-blocking layer BL may have a sufficiently great thickness such that the printing layer PL disposed under the light-blocking layer BL is not viewed from the outside through the bezel region BZA. The printing layer PL may have a thickness such that the barcode pattern BCP is engraved thereon.

The printing layer PL may be disposed under the light-blocking layer BL while overlapping the pattern region PA of the non-detection region NSA. The printing layer PL may substantially define the pattern region PA. The printing layer PL may be disposed directly on a lower surface of the first light-blocking part B1. The printing layer PL may be disposed not to overlap the infrared detection region ISA, and may thus be spaced apart from the ink layer IKL (refer to FIG. 6A) in a plan view.

As illustrated in FIG. 7A, the printing layer PL may include the barcode pattern BCP. The printing layer PL may include an upper surface adjacent to the light-blocking layer BL and a lower surface opposite to the upper surface, and the barcode pattern BCP may be defined in the lower surface of the printing layer PL. Specifically, the barcode pattern BCP may be engraved in the lower surface of the printing layer PL. The barcode pattern BCP is defined in the lower surface of the printing layer PL in FIG. 7A, but the inventive concept is not necessarily limited thereto. The barcode pattern BCP may be defined in all regions such as on the upper surface or on the side surface of the printing layer PL. The barcode pattern BCP may be an engraved pattern extending upwards from the lower surface of the printing layer PL.

The printing layer PL may include a base resin, and a pigment or dye dispersed in the base resin. The printing layer PL may include an infrared ink. The printing layer PL may absorb visible rays, and may transmit infrared rays. At least one among the base resin and the pigment or dye included in the printing layer PL may selectively transmit infrared rays among visible rays and infrared rays. In an embodiment, the printing layer PL may absorb about 90% or more of visible rays, and may transmit about 80% or more, or about 90% or more of infrared rays, for example.

As illustrated in FIG. 7B, the printing layer PL may include a first printing layer PL1 disposed under the light-blocking layer BL and a second printing layer PL2 disposed under the first printing layer PL1. The first printing layer PL1 may be disposed directly on the lower surface of the light-blocking layer BL, and the second printing layer PL2 may be disposed directly on the lower surface of the first printing layer PL1. The first ink layer IK1 may include a black ink or a colored ink, and the second ink layer IK2 may include a white ink. Although not illustrated, the barcode pattern BCP may be defined in a lower surface of the second printing layer PL2.

Hereinafter, the printing layer PL and the ink layer IKL will be described in more detail with reference to FIGS. 6A, 6B, 7A, and 7B.

The printing layer PL is disposed overlapping the pattern region PA of the non-detection region NSA, and the ink layer IKL is disposed overlapping the infrared detection region ISA. Accordingly, the printing layer PL and the ink layer IKL are spaced apart from each other in a plan view.

A material included in the printing layer PL and a material included in the ink layer IKL may be the same. A material forming the printing layer PL and a material forming the ink layer IKL may be the same. The printing layer PL and the ink layer IKL may include an infrared ink that selectively transmits infrared rays. The printing layer PL and the ink layer IKL may be formed through the same printing process, and thus include the same material.

As illustrated in FIGS. 6B and 7B, a material included in the first ink layer IK1 and a material included in the first printing layer PL1 may be the same. The first ink layer IK1 and the first printing layer PL1 may be formed using the same ink through the same printing process. The first ink layer IK1 and the first printing layer PL1 may include a black ink or a colored ink. A material included in the second ink layer IK2 and a material included in the second printing layer PL2 may be the same. The second ink layer IK2 and the second printing layer PL2 may be formed using the same ink through the same printing process. The second ink layer IK2 and the second printing layer PL2 may include a white ink.

In an electronic device, an input of an identification code for product identification may be desired components such as a window. Accordingly, in a typical window, a predetermined ink layer is disposed on a lower surface of the window as a base for inputting the identification code, and a separate process for the predetermined ink layer is desired when the window is manufactured. In a window in an embodiment of the inventive concept, an ink layer for inputting the identification code may be manufactured using an infrared ink which has been used for a typical infrared sensor, thereby reducing operations desired for a window manufacturing process. Since the manufacturing process operations are reduced, it is possible to reduce the frequency of occurrence of scratches on windows, stains on ink, or the like, thereby increasing the process efficiency. In addition, manufacturing costs may be reduced by simplifying the process due to using a single ink unlike a typical manufacturing process in which a plurality of inks are used. In an embodiment of the inventive concept, by introducing, to an ink layer for inputting an identification code, an infrared ink which has been used for detecting infrared rays in a window, it is possible to simplify typical window manufacturing processes, and thus process efficiency may be increased and manufacturing costs may be reduced.

Figure 8:
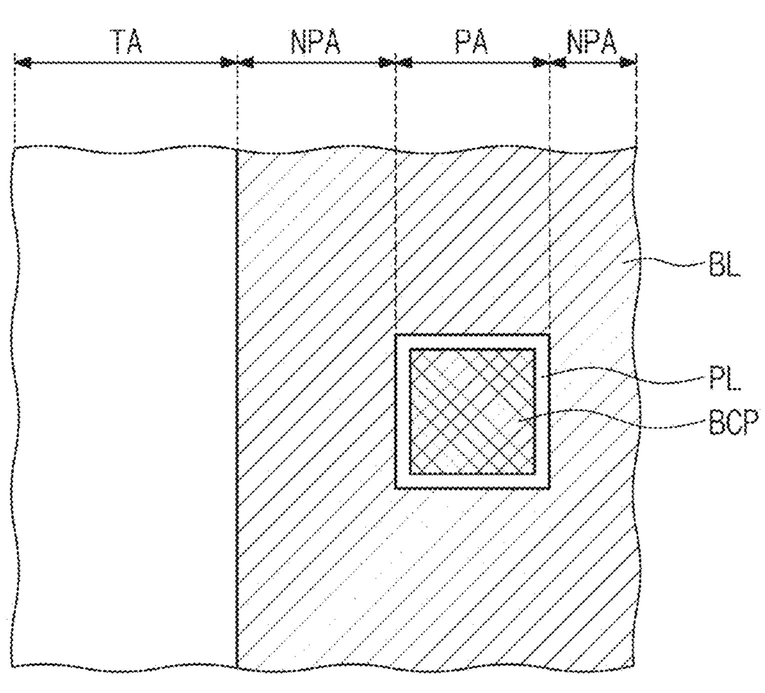
FIG. 8 is a plan view of an embodiment of a window according to the inventive concept.
Figure 8:
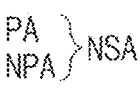
Figure 8:
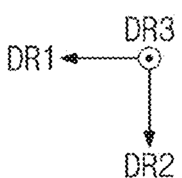

FIG. 8 is a plan view of an embodiment of a window according to the inventive concept. FIG. 8 partially illustrates a region in which a printing layer of a non-detection region is disposed and a transmission region adjacent thereto in the window.

As illustrated in FIG. 8, a printing layer PL may include a barcode pattern BCP.

The barcode pattern BCP may be defined in a lower surface of the printing layer PL. As illustrated in FIG. 8, the barcode pattern BCP may be defined in a part of the lower surface of the printing layer PL in a plan view, but the inventive concept is not limited thereto. The barcode pattern BCP may be formed to entirely overlap the lower surface of the printing layer PL.

The barcode pattern BCP may be engraved in the lower surface of the printing layer PL. Referring to a window manufacturing method in an embodiment of the inventive concept to be described later, the barcode pattern BCP may be formed through laser-etching in which the lower surface of the printing layer PL is irradiated with laser.

The barcode pattern BCP may mean a code pattern designed to be read by a reading device such as a computer, and made by combining black and white lines having different thicknesses or shapes. The barcode pattern BCP may be a linear barcode pattern or a two-dimensional pattern having a matrix form. In an embodiment, the barcode pattern BCP may be a quick response ("QR") code having a black and white grid pattern, for example. The barcode pattern BCP may function as an identification mark for identifying a source of a component, but the function of the barcode pattern BCP is not limited thereto.

Figure 9:
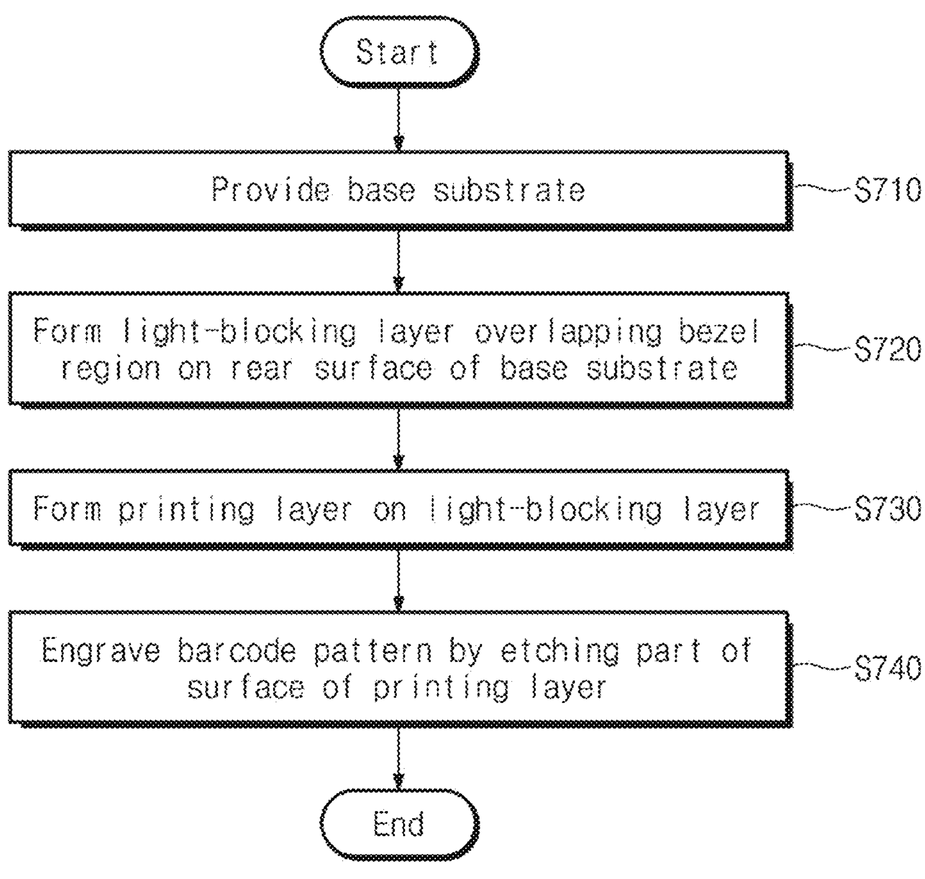
FIG. 9 is a flowchart illustrating an embodiment of a method of manufacturing a window according to the inventive concept.

FIG. 9 is a flowchart illustrating an embodiment of a method of manufacturing a window according to the inventive concept. FIGS. 10A to 10E are a cross-sectional view sequentially illustrating operations of the method of manufacturing a window in an embodiment of the inventive concept, respectively.

As illustrated in FIG. 9, the method of manufacturing a window in an embodiment of the inventive concept may include providing a base substrate (S710), forming a light-blocking layer overlapping a bezel region of a window on a lower surface of the base substrate (S720), forming a printing layer under the light-blocking layer (S730), and engraving a barcode pattern in a lower surface of the printing layer (S740).

Figure 10A:
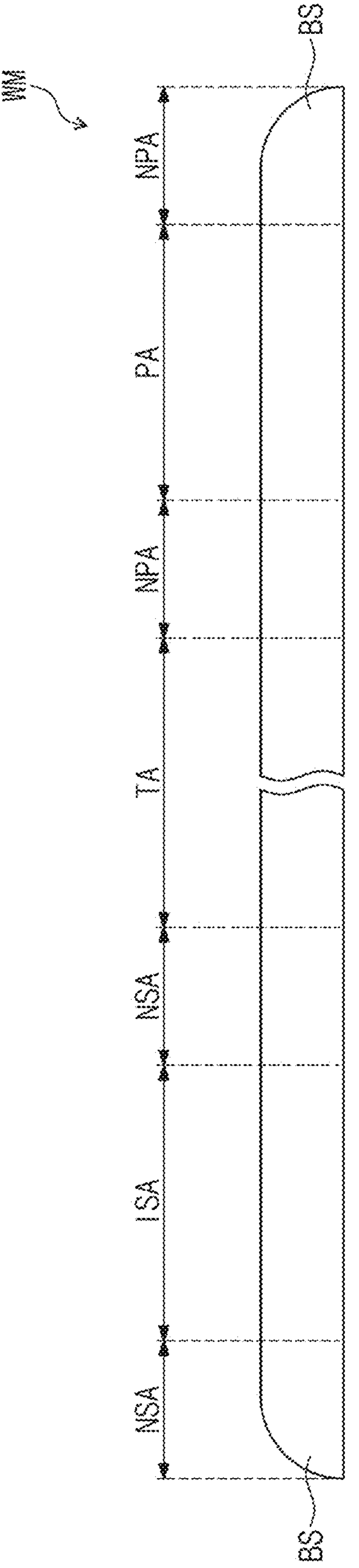
FIGS. 10A to 10E are a cross-sectional view sequentially illustrating an embodiment of operations of a method of manufacturing a window according to the inventive concept, respectively.
Figure 10A:
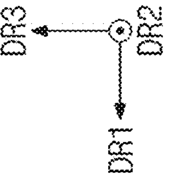

Referring to FIG. 10A, the method of manufacturing a window may include providing the base substrate BS. In an embodiment, the base substrate BS may correspond to a glass substrate.

Figure 10B:
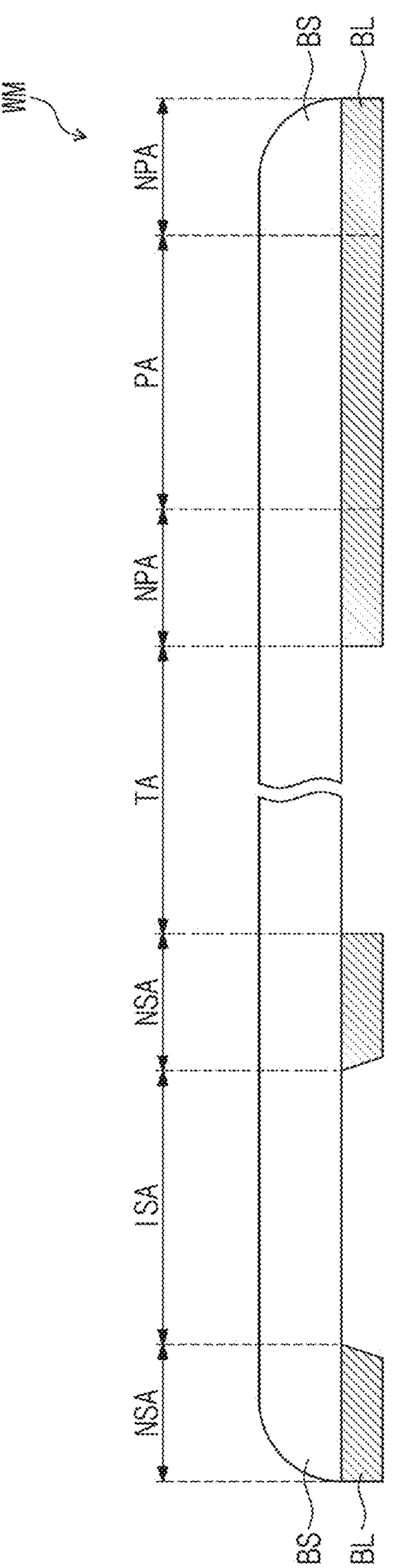
Figure 10B:
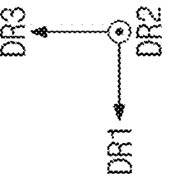

Referring to FIGS. 10A and 10B, in an embodiment, the method may include forming the light-blocking layer BL under the base substrate BS. The light-blocking layer BL may be formed to be disposed directly on a lower surface of the base substrate BS. The light-blocking layer BL may be formed to overlap a non-detection region NSA of a bezel region BZA. The light-blocking layer BL may be formed not to overlap the transmission region TA. In an embodiment, the light-blocking layer BL may be formed by removing a part corresponding to the transmission region TA and the infrared detection region ISA after forming the light-blocking layer BL on the entirety of the lower surface of the base substrate BS. The light-blocking layer BL may include a multi-layered structure.

Figure 10C:
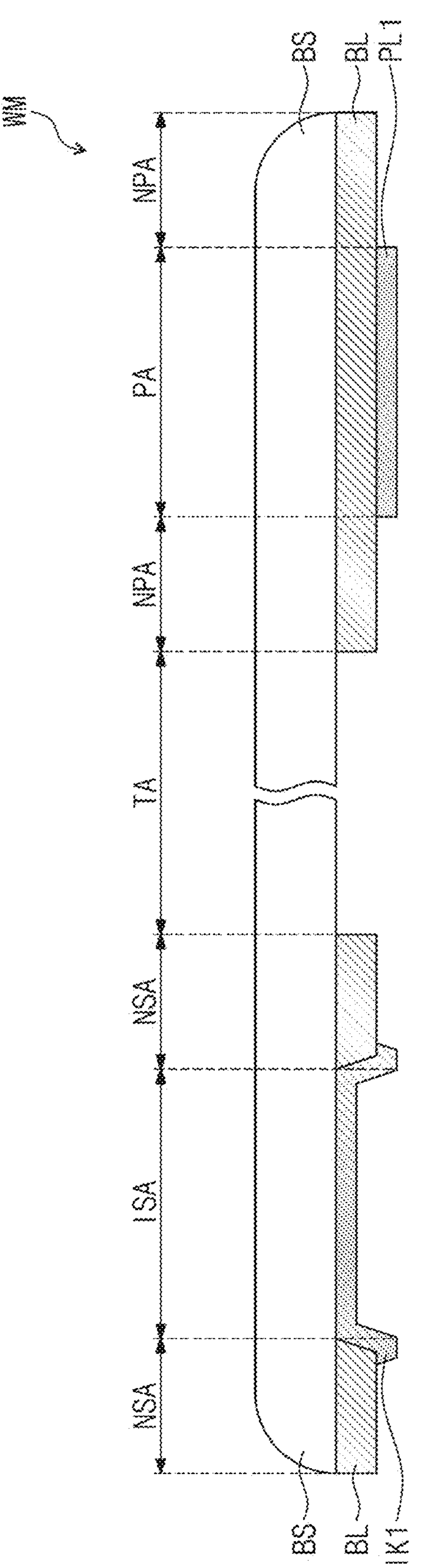
Figure 10C:
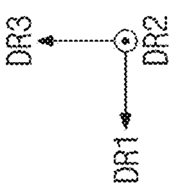
Figure 10D:
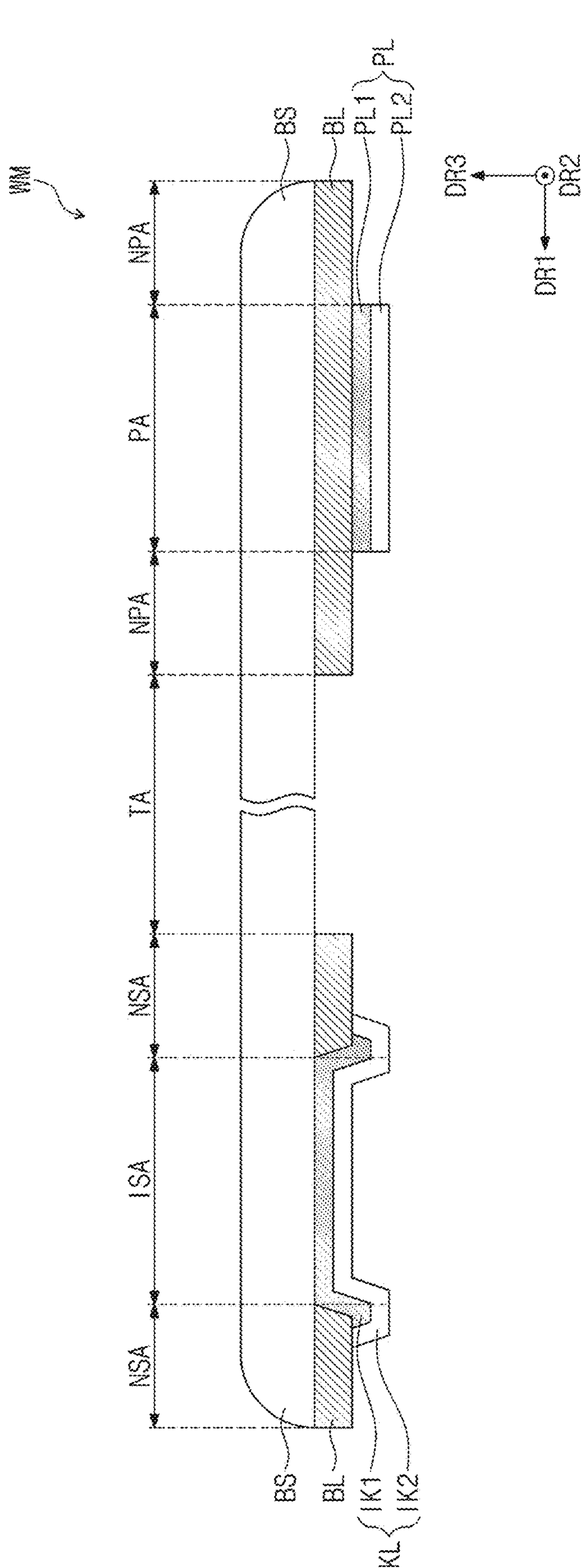

Referring to FIGS. 10C and 10D, in an embodiment, the method may include forming the printing layer PL under the light-blocking layer BL. The printing layer PL may be formed to be directly disposed on a lower surface of the light-blocking layer BL. The printing layer PL may include an ink that selectively transmits infrared rays. The printing layer PL may be formed to overlap a pattern region PA. In a process for forming the printing layer PL, the ink layer IKL may be simultaneously formed to overlap the infrared detection region ISA.

The printing layer PL and the ink layer IKL may be formed through the same printing process. The printing layer PL and the ink layer IKL may be formed by providing the same material through the same printing process. Specifically, as illustrated in FIG. 10C, a first printing layer PL1 and a first ink layer IK1 may be formed by providing the same material through the same printing process. As illustrated in FIG. 10D, a second printing layer PL2 and a second ink layer IK2 may be formed by providing the same material through the same printing process. The printing layer PL may be formed to overlap the pattern region PA of the non-detection region NSA. The ink layer IKL may be formed to overlap the infrared detection region ISA. In this case, the ink layer IKL may be spaced apart from the printing layer PL, and may be formed on the lower surface of the base substrate BS.

Figure 10E:
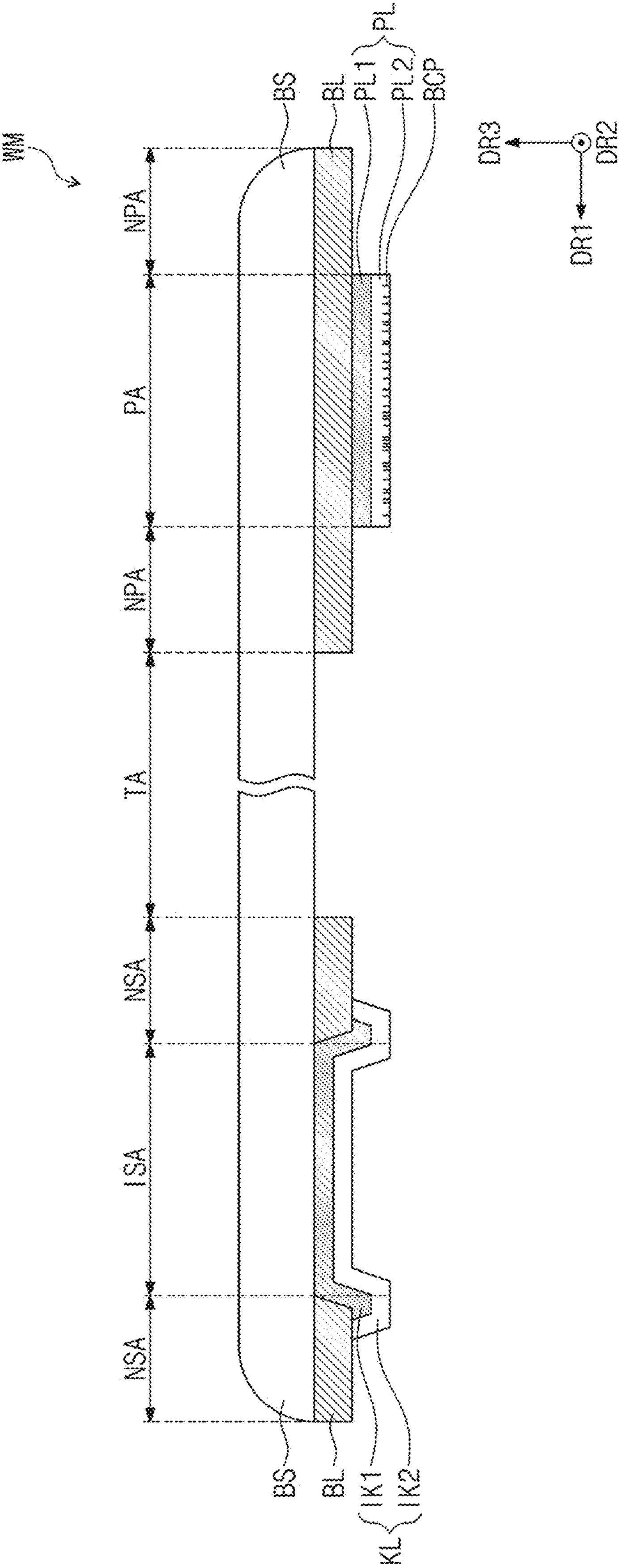

Referring to FIG. 10E, in an embodiment, the method may include engraving the barcode pattern BCP in the lower surface of the printing layer PL. The engraving of the barcode pattern BCP in the lower surface of the printing layer PL may include etching a part of the lower surface of the printing layer PL. In an embodiment, the engraving of the barcode pattern BCP may include irradiating the lower surface of the printing layer PL with laser, for example. That is, as the lower surface of the printing layer PL is irradiated with leaser, the barcode pattern BCP having a shape extending upwards from the lower surface of the printing layer PL may be formed. A portion irradiated with the laser has a black color, and a portion not irradiated with the laser has a white color, so that the barcode pattern BCP recognizable through a reading device may be formed.

When a window in an embodiment of the inventive concept or an electronic device including the window in an embodiment of the inventive concept is manufactured, manufacturing costs may be reduced and the process efficiency may be increased.

In the above, description has been made with reference to preferred embodiments of the inventive concept, but those skilled in the art or those of ordinary skill in the relevant technical field may understand that various modifications and changes may be made to the inventive concept within the scope not departing from the spirit and the technology scope of the inventive concept described in the claims to be described later. Therefore, the technical scope of the inventive concept is not limited to the contents described in the detailed description of the specification, but should be determined by the claims.

What is claimed is:

1. A window comprising:

a base substrate including a bezel region and a transmission region in a plan view;

a light-blocking layer disposed under the base substrate, and overlapping the bezel region; and a printing layer disposed under the light-blocking layer, and including a barcode pattern, wherein the printing layer absorbs visible rays, and transmits infrared rays, and the barcode pattern overlaps the light-blocking layer in a thickness direction.

2. The window of claim 1, wherein the bezel region comprises an infrared detection region and a non-detection region, and the printing layer overlaps the non-detection region.

3. The window of claim 1, wherein the bezel region surrounds the transmission region in the plan view, and the light-blocking layer extends along the bezel region and entirely overlaps the bezel region.

4. The window of claim 1, wherein the light-blocking layer comprises:

a first light-blocking part under which the printing layer is disposed; and a second light-blocking part which does not overlap the printing layer in the plan view.

5. The window of claim 1, wherein the barcode pattern is defined in a lower surface of the printing layer.

6. The window of claim 1, wherein the printing layer comprises a base resin and a pigment or dye dispersed in the base resin.

7. The window of claim 1, wherein the printing layer comprises:

a first printing layer disposed under the light-blocking layer; and a second printing layer disposed under the first printing layer.

8. The window of claim 7, wherein the barcode pattern is defined in a lower surface of the second printing layer.

9. The window of claim 1, wherein the barcode pattern is a two-dimensional pattern having a matrix form.

10. The window of claim 1, wherein the barcode pattern is engraved in a lower surface of the printing layer.

* * * * *